US008517170B2

(12) United States Patent
Powers

(10) Patent No.: US 8,517,170 B2
(45) Date of Patent: Aug. 27, 2013

(54) CONVEYOR CHAIN COVER

(75) Inventor: Scott G. Powers, Winchester, KY (US)

(73) Assignee: Joy MM Delaware, Inc., Wilmington, DE (US)

( * ) Notice: Subject to any disclaimer, the term of this patent is extended or adjusted under 35 U.S.C. 154(b) by 147 days.

(21) Appl. No.: 13/182,241

(22) Filed: Jul. 13, 2011

(65) Prior Publication Data

US 2012/0080292 A1 Apr. 5, 2012

Related U.S. Application Data

(60) Provisional application No. 61/388,832, filed on Oct. 1, 2010.

(51) Int. Cl.
*B65G 21/10* (2006.01)

(52) U.S. Cl.
USPC .................................... 198/860.5; 198/735.5

(58) Field of Classification Search
USPC .......... 198/735.3, 735.5, 860.3, 860.4, 860.5, 198/817, 717, 721, 728
See application file for complete search history.

(56) References Cited

U.S. PATENT DOCUMENTS

| | | | | |
|---|---|---|---|---|
| 3,828,916 | A * | 8/1974 | Patz | 198/735.5 |
| 4,008,800 | A * | 2/1977 | Forsyth | 198/860.5 |
| 4,282,968 | A * | 8/1981 | Temme | 198/735.2 |
| 4,982,832 | A * | 1/1991 | Garbelman et al. | 198/735.3 |
| 5,060,788 | A * | 10/1991 | Compton et al. | 198/831 |
| 7,152,730 | B2 * | 12/2006 | Gerke | 198/860.3 |
| 7,207,632 | B2 * | 4/2007 | Lowery | 299/11 |
| 2005/0211534 | A1 * | 9/2005 | Tefend | 198/860.2 |

FOREIGN PATENT DOCUMENTS

| | | | |
|---|---|---|---|
| DE | 4432772 | | 5/1995 |
| JP | 60-252522 | * | 12/1985 |
| PL | 48823 | | 1/1989 |
| PL | 171343 | | 4/1997 |

OTHER PUBLICATIONS

Polish Search Report from the Patent Office of the Republic of Poland for Application No. P-395804 dated Oct. 14, 2011 (2 pages).

* cited by examiner

*Primary Examiner* — James R Bidwell
(74) *Attorney, Agent, or Firm* — Michael Best & Friedrich LLP

(57) ABSTRACT

A feeder-breaker for processing material. The feeder-breaker generally includes a frame, a conveyor supported by the frame and operable to convey material along the axis, a conveyor chain cover removably connected to the frame to enable access to components of the conveyor from an interior of the frame, and a breaker positioned adjacent the conveyor and operable to process material. The conveyor chain cover includes a chain cover member engaged with the side member. The chain cover member includes a cover portion that extends from the side member and over the chain to cover the chain and an access panel is connected to the chain cover member.

20 Claims, 4 Drawing Sheets

CONVEYOR CHAIN COVER

RELATED APPLICATIONS

This application claims priority to U.S. Provisional Application No. 61/388,832, filed on Oct. 1, 2010, the entire contents of which are hereby incorporated by reference.

FIELD OF THE INVENTION

The present invention relates to conveyors and, more particularly, to conveyors for feeder-breakers.

SUMMARY

In one independent embodiment, a feeder-breaker for processing material may generally include a frame, a conveyor supported by the frame and operable to convey material along the axis, a conveyor chain cover removably connected to the frame to enable access to components of the conveyor from an interior of the frame, and a breaker positioned adjacent the conveyor and operable to process material. The frame may include a side member extending along an axis, the side member having an interior surface facing toward an interior of the frame and an exterior. The conveyor has an intake end and a discharge end and may include a deck for supporting material, a chain movably supported on the deck and extending generally along the axis, the chain being positioned proximate the interior surface of the side member, a plurality of flights coupled to the chain for movement with the chain, and a drive engaging the chain and operable to move the chain such that the flights travel across the deck to move the material from the intake end to the discharge end. The conveyor chain cover may include a chain cover member engaged with the side member, the chain cover member including a cover portion extending from the side member and over the chain to cover the chain, and an access panel connected to the chain cover member.

In some constructions, the frame further includes a second side member extending along the axis, the conveyor being between the first-mentioned side member and the second side member. The conveyor may further include a second chain movably supported on the deck and extending generally along the axis, the second chain being positioned proximate the second side member, the plurality of flights being coupled between the first-mentioned chain and the second chain for movement with the first-mentioned chain and the second chain. The feeder-breaker may further include a second conveyor chain cover removably connected to the interior surface of the second side member to enable access to components of the conveyor from the interior of the frame, the second conveyor chain cover including a second chain cover member engaged with the second side member, the second chain cover member including a second cover portion extending from the second side member and over the second chain to cover the second chain, and a second access panel connected to the second chain cover member.

In some constructions, the frame side member and the chain cover member may include locating features to position the chain cover member on the frame side member. In such constructions, one of the frame side member and the chain cover member may include a projection, and the other of the frame side member and the chain cover member may include an aperture sized to receive the projection to locate the chain cover member on the side member.

In some constructions, the cover portion extends substantially parallel to the deck. The chain cover member may include a mounting portion angled with respect to the cover portion, the mounting portion being coupled to the interior surface of the side member. The mounting portion may include a flange extending along the axis, the access panel being connected to the flange. The access panel may be coupled to the mounting portion at an oblique angle relative to the cover portion and/or relative to the deck.

In some constructions, the frame may include an intake end member and a discharge end member, the side members and the end members being connected to define the interior of the frame. In some constructions, the chain may form a continuous loop and rotates around the deck.

In another independent embodiment, a cover assembly for a conveyor of a feeder-breaker may generally include a chain cover member engageable with a side member of a frame, the chain cover member including a cover portion extending from the side member and over a conveyor chain to cover the chain, and an access panel connected to the chain cover member. The chain cover member and the access panel may be removably connected to the interior surface of the side member to enable access to components of the conveyor from the interior of the frame.

The frame may further include a second side member extending along the axis, the conveyor being between the first-mentioned side member and the second side member. The conveyor may further include a second chain movably supported on the deck and extending generally along the axis, the second chain being positioned proximate the second side member, the plurality of flights being coupled between the first-mentioned chain and the second chain for movement with the first-mentioned chain and the second chain. The cover assembly may further include a second chain cover member engageable with the second side member, the second chain cover member including a second cover portion extending from the second side member and over the second chain to cover the second chain, and a second access panel connected to the second chain cover member. The chain cover member and the second access panel may be removably connected to the interior surface of the second side member to enable access to components of the conveyor from the interior of the frame.

In yet another independent embodiment, a method of assembling a cover assembly for a conveyor of a feeder-breaker may be provided. The method may generally include engaging a chain cover member with an interior surface of a side member of a frame, positioning a cover portion of the chain cover member to extend from the side member and over a conveyor chain to cover the chain, engaging an access panel to the chain cover member, and removably connecting the cover assembly to the interior surface of the side member to enable access to components of the conveyor from the interior of the frame.

Independent aspects of the invention will become apparent by consideration of the detailed description and accompanying drawings.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
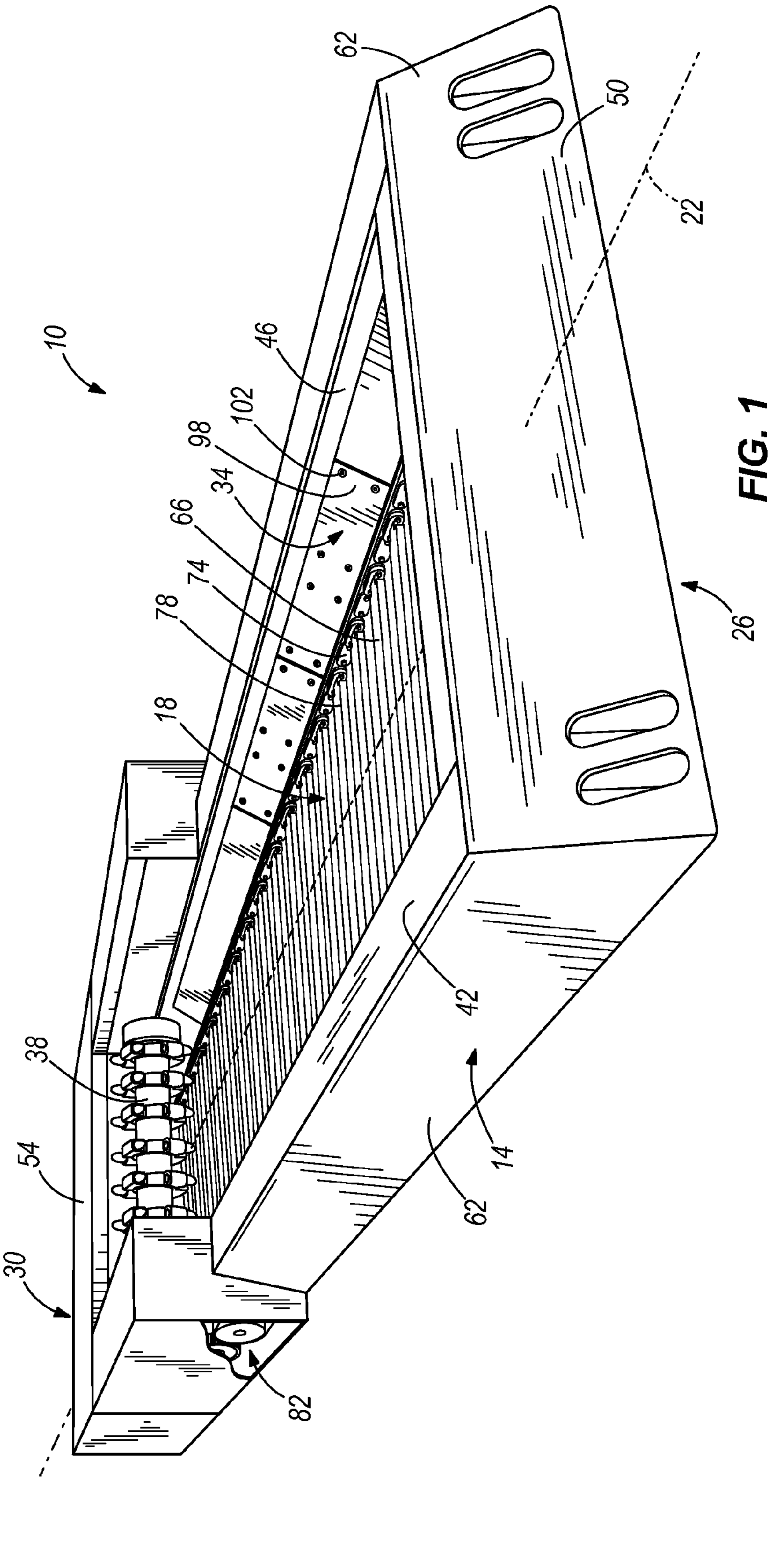
FIG. 1 is a perspective view of a feeder-breaker according to independent aspects of the invention.
Figure 2:
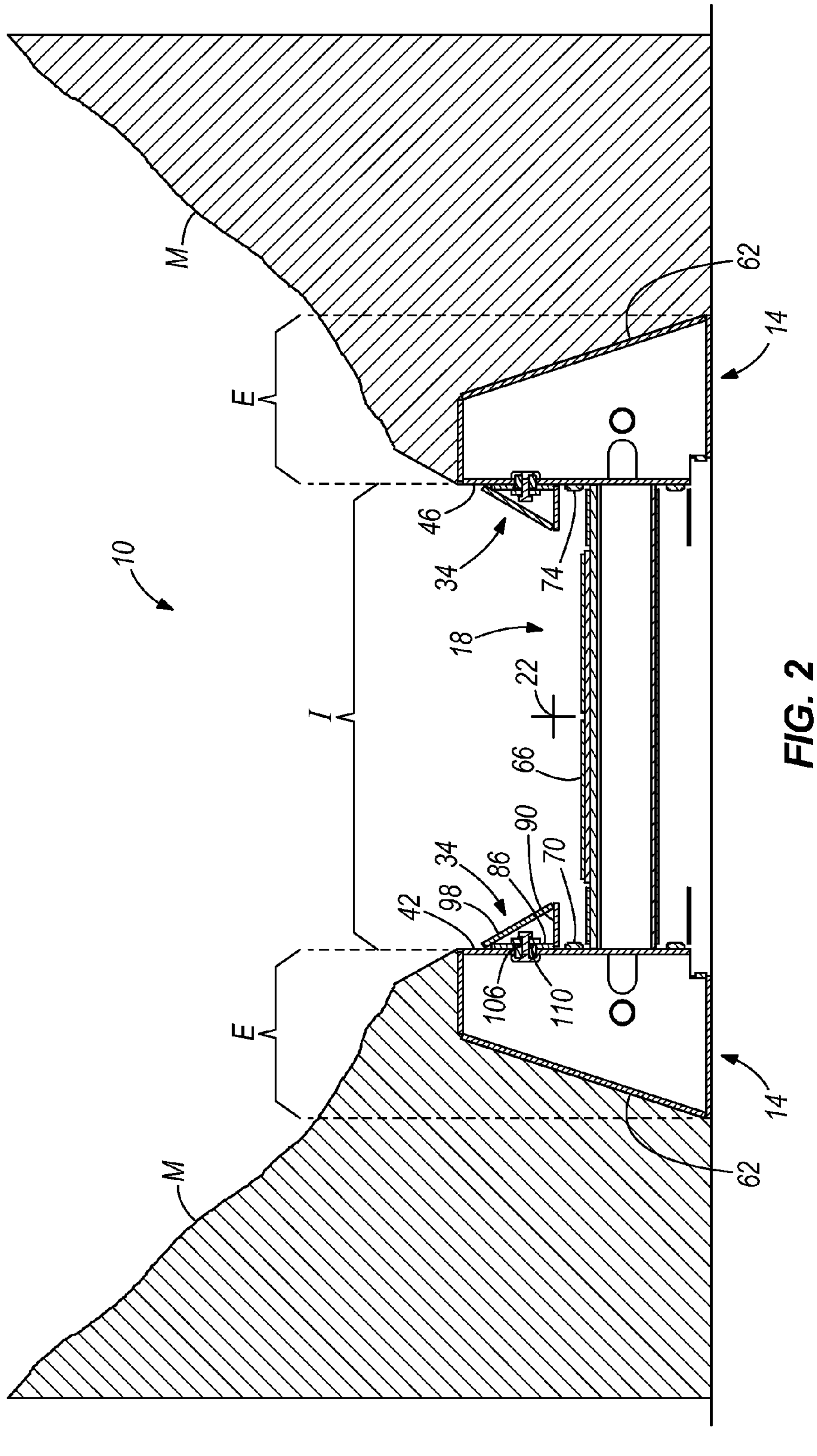
FIG. 2 is a section view of the feeder-breaker shown in FIG. 1 and illustrating material banked around the feeder-breaker.
Figure 3:
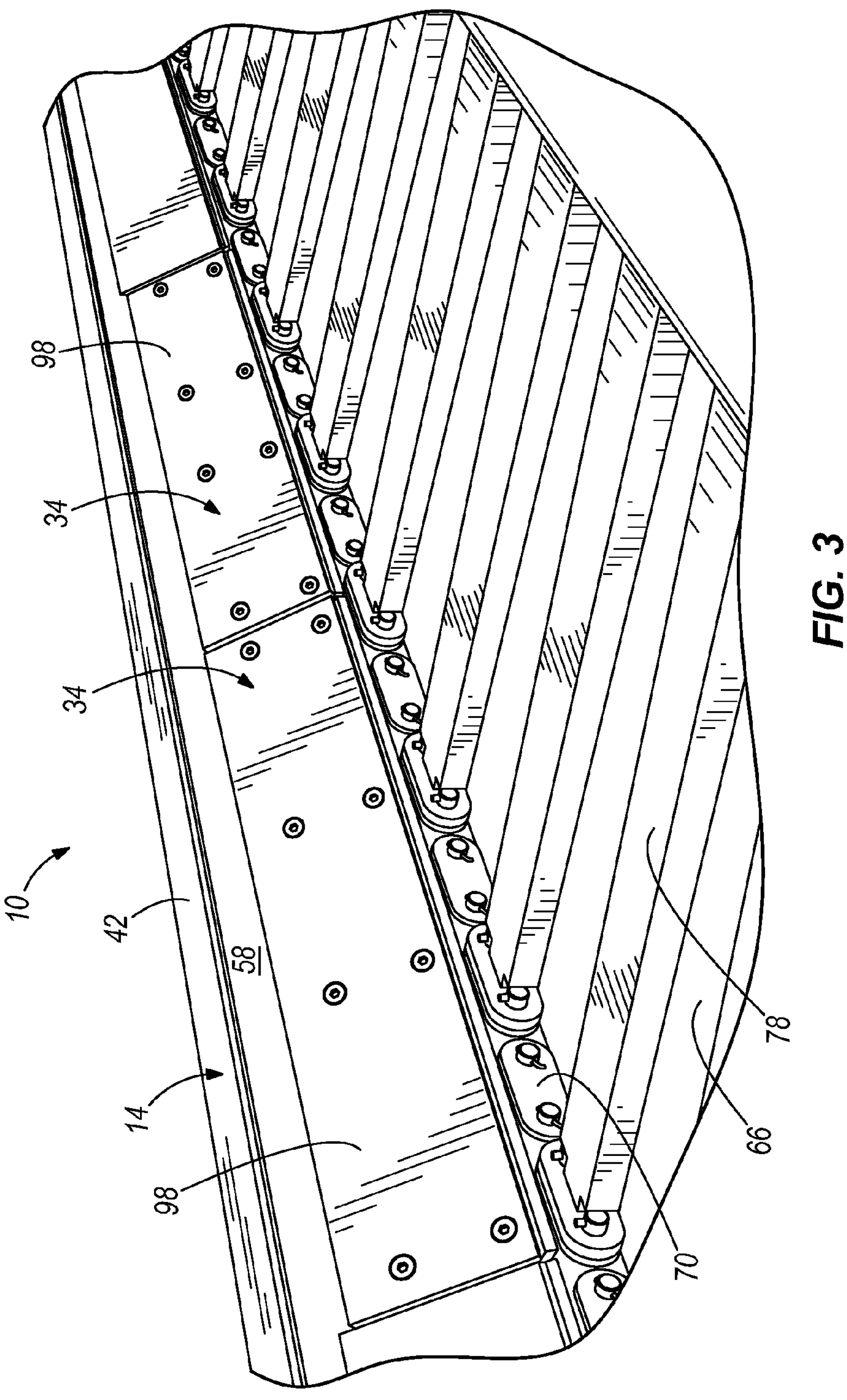
FIG. 3 is an enlarged detail view of a portion of the feeder-breaker shown in FIG. 1 and illustrating a conveyor and a conveyor chain cover.
Figure 4:
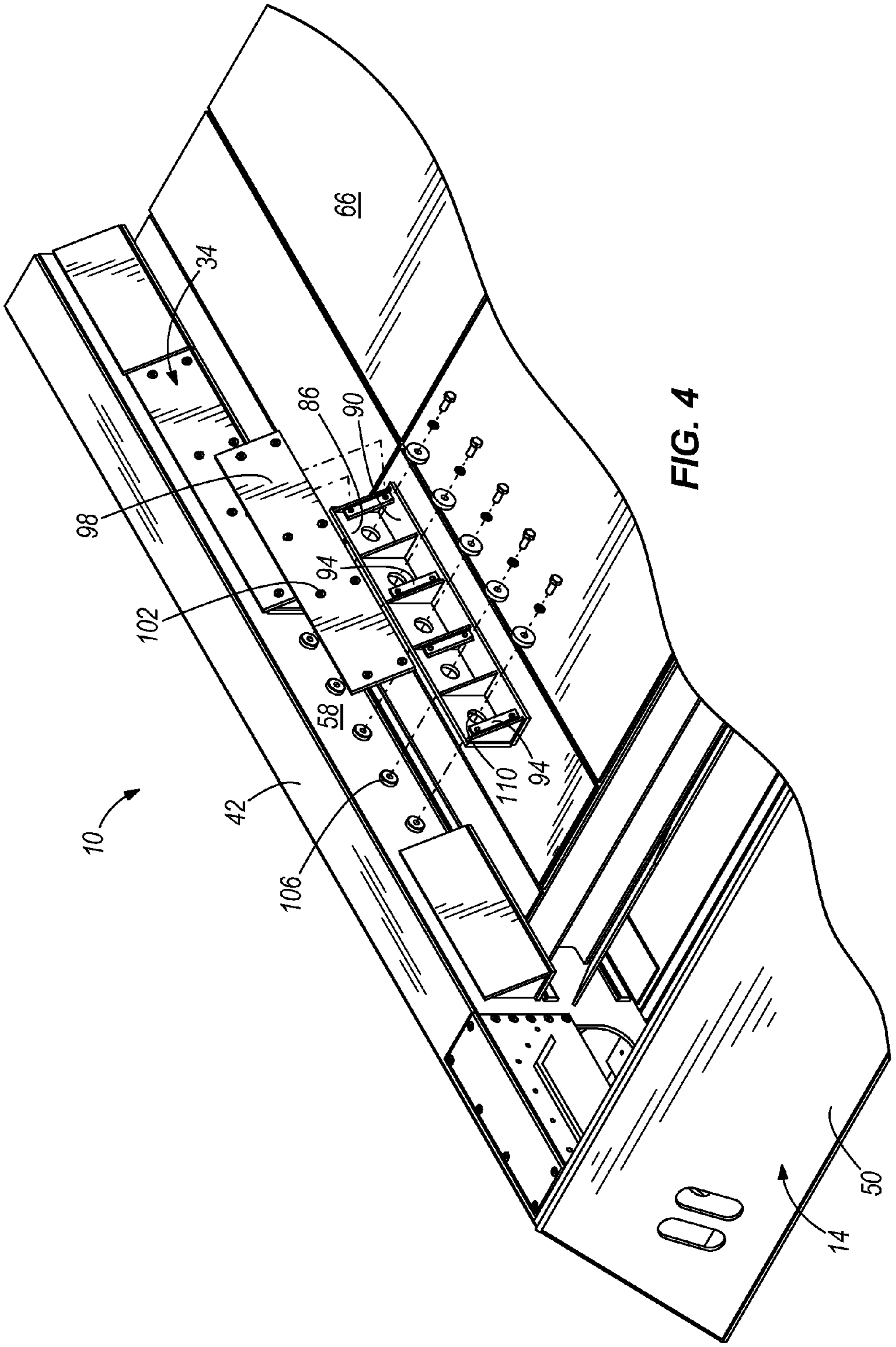
FIG. 4 is an exploded view of the conveyor chain cover shown in FIG. 3.

FIGS. 1-4 illustrate a feeder-breaker 10 for processing material. The feeder-breaker 10 generally includes a frame 14, a conveyor 18, at least one conveyor chain cover assembly 34, and a breaker 38. The feeder-breaker 10 operates to process material, such as coal, into a smaller more workable size and to convey the material along an axis 22 from an intake end 26 to a discharge end 30.

The frame 14 includes a first side member 42, a second side member 46, an intake end member 50, and a discharge end member 54. The first side member 42 and the second side member 46 extend substantially parallel to the axis 22 between the intake end member 50 and the discharge end member 54. The first side member 42 and the second side member 46 each have an interior surface 58 and an exterior portion 62. The frame members 42, 46, 50, 54 are connected and define an interior I of the frame 14. An exterior E of the frame 14 is defined outside of the connected frame members 42, 46, 50, 54.

The conveyor 18 includes a deck 66 providing a substantially flat surface for supporting material M on the conveyor 18. A first chain 70 and a second chain 74 each extend along the axis 22 and form a continuous loop around the deck 66. Each chain 70, 74 includes a plurality of connected links, and a plurality of flights 78 are connected to and extend between the first chain 70 and the second chain 74. A drive 82 is coupled to the first chain 70 and the second chain 74 to rotate the first and second chains 70, 74 around the deck 66. The flights 78 move with the chains 70, 74 to move material M along the conveyor 18 from the intake end 26 toward the discharge end 30.

In the illustrated construction, the feeder-breaker 10 includes a conveyor chain cover assembly 34 for each conveyor chain 70, 74, and each conveyor chain cover assembly 34 is configured and positioned to inhibit or prevent material M from entering into and/or interfering with the associated chain 70, 74. The conveyor chain cover assemblies 34 are removably connected to the frame 14 to allow access to the components of the conveyor 18 from the interior I of the frame 14. The conveyor chain cover assemblies 34 are substantially the same, and only one conveyor chain cover assembly 34 will be described in detail.

Each illustrated conveyor chain cover assembly 34 is formed of a number of sections along the length of the conveyor 18. Each section of a conveyor cover assembly 34 includes a chain cover member 86 removably mounted to the interior surface 58 of the side frame member 42 of the frame 14. The chain cover member 86 includes a cover portion 90 substantially covering the chain 70. The illustrated cover portion 90 projects (e.g., at a generally ninety-degree angle) from the interior surface 58 to cover the chain 70 and is oriented substantially parallel to the deck 66. In other constructions (not shown), the cover portion 90 may be oriented at a different angle with respect to the interior surface 58 and/or with respect to the deck 66. Each cover portion 90 functions to inhibit material M from directly accessing the chains 70, 74 to, for example, reduce wear, increase life of the chains 70, 74, improve the function/operation of the chains 70, 74, the conveyor 18, etc.

The chain cover member 86 further includes mounting portions 94. The illustrated mounting portions 94 include projections extending from the cover portion 90 and flanges 96 connected to the projections. The illustrated projections form an oblique angle relative to the deck 66, and the cover portion 90 and the illustrated flanges 96 extend substantially along the axis 22. In other constructions (not shown), the mounting portion 94 may be arranged differently. For example, the flanges 96 may extend along substantially the full length of the conveyor chain cover 34, and the projections may be eliminated.

The conveyor chain cover 34 further includes an access panel 98 coupled to the mounting portion 94. The illustrated access panel 98 includes apertures 102 and is fastened to the mounting portion 94 with fasteners (not shown) though the apertures 102. In the illustrated construction, the access panel 98 is arranged at an oblique angle relative to the deck 66 and relative to the cover portion 90. The oblique angle formed by the access panel 98 relative to the deck 66 allows material M to fall down onto the conveyor 18 and inhibits material M build-up on top of the cover portion 90.

As mentioned above, the conveyor chain cover 34 is removably mounted to the interior surface 58 of the frame 14. The side frame member 42 and the conveyor chain cover assembly 34 each include locating features to, for example, aid in the desired alignment and installation of the conveyor chain cover assembly 34. In the illustrated construction, the interior surface 58 of the side frame member 42 includes projections or bosses 106 extending substantially normal to the interior surface 58. Each conveyor chain cover assembly 34 defines apertures 110 sized to receive the bosses 106. When the conveyor chain cover assembly 34 is installed, the bosses 106 are received within the apertures 110 to locate and partially support the conveyor chain cover assembly 34. Once positioned, the conveyor chain cover assembly 34 is fastened into place on the frame 14. It should be understood that, in other constructions (not shown), the locating features may be arranged differently and/or different locating features may be provided.

To assemble the conveyor chain cover assembly 34 to the frame 14, an operator first removes the access panel 98 from the chain cover member 86. With the access panel 98 removed, from the interior I of the frame 14, the operator positions the chain cover member 86 on the interior surface 58 of the side frame member 42. The apertures 110 are aligned with the bosses 106, and the chain cover member 86 is moved into position with the cover portion 90 covering the chain 70. Fasteners are then installed from the interior I of the frame 14 to hold the chain cover member 86 in position. The access cover 98 is then fastened to the mounting portion 94 of the chain cover member 86.

To remove the conveyor chain cover assembly 34, from the interior I of the frame 14, the operator removes the access panel 98. With the access panel 98 removed, the operator unfastens the chain member 86 from the interior surface 58 of the side frame member 42. With the conveyor chain cover assembly 34 removed, the operator may access the components of the conveyor 18 from the interior I of the frame 14. Because the conveyor 18 is accessible from the interior I of the frame 14, material M banked on the exterior E of the frame 14 does not need to be moved. In contrast, prior systems included exterior frame side panels that must be removed to access the conveyor, the drive chains, etc., and removal of the covers required the removal of at least a portion of the material M banked around the feeder-breaker 10.

The breaker 38 is positioned between the intake end 26 and the discharge end 30 to process (e.g., reduce the size of) the material M. Any suitable breaker 38 may be used in the feeder-breaker 10, as desired.

Various alternatives to the features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments.

Embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A feeder-breaker for processing material, the feeder-breaker comprising:

- a frame including a side member extending along an axis, the side member having an interior surface facing toward an interior of the frame and an exterior portion, the exterior portion being configured to be covered by material during operation of the feeder-breaker;
- a conveyor supported by the frame and operable to convey material along the axis, the conveyor having an intake end and a discharge end, the conveyor including
  - a deck for supporting material,
  - a chain movably supported on the deck and extending generally along the axis, the chain being positioned proximate the interior surface of the side member,
  - a plurality of flights coupled to the chain for movement with the chain, and
  - a drive engaging the chain and operable to move the chain such that the flights travel across the deck to move the material from the intake end to the discharge end;
- a conveyor chain cover removably connected to the interior surface of the side member to enable removal of the conveyor chain cover and access to components of the conveyor from the interior of the frame, the conveyor chain cover including
  - a chain cover member engaged with the side member, the chain cover member including a cover portion extending from the side member and over the chain to cover the chain, and
  - an access panel connected to the chain cover member; and
- a breaker positioned adjacent the conveyor and operable to process material.

2. The feeder-breaker of claim 1, wherein the frame further includes a second side member extending along the axis, the conveyor being between first-mentioned side member and second side member, wherein the conveyor further includes a second chain movably supported on the deck and extending generally along the axis, the second chain being positioned proximate the second side member, the plurality of flights being coupled between the first-mentioned chain and the second chain for movement with the first-mentioned chain and the second chain, and wherein the feeder-breaker further comprises a second conveyor chain cover removably connected to the interior surface of the second side member to enable access to components of the conveyor from the interior of the frame, the second conveyor chain cover including

- a second chain cover member engaged with the second side member, the second chain cover member including a second cover portion extending from the second side member and over the second chain to cover the second chain, and
- a second access panel connected to the second chain cover member.

3. The feeder-breaker of claim 1, wherein the frame includes intake end member and discharge end member, the side members and the end members being connected to define the interior of the frame.

4. The feeder-breaker of claim 1, wherein the chain forms a continuous loop and rotates around the deck.

5. The feeder-breaker of claim 1, wherein the frame side member and the chain cover member include locating features to position the chain cover member on the frame side member.

6. A feeder-breaker for processing material, the feeder-breaker comprising:

- a frame including a side member extending along an axis, the side member having an interior surface facing toward an interior of the frame and an exterior;
- a conveyor supported by the frame and operable to convey material along the axis, the conveyor having an intake end and a discharge end, the conveyor including
  - a deck for supporting material,
  - a chain movably supported on the deck and extending generally along the axis, the chain being positioned proximate the interior surface of the side member,
  - a plurality of flights coupled to the chain for movement with the chain, and
  - a drive engaging the chain and operable to move the chain such that the flights travel across the deck to move the material from the intake end to the discharge end;
- a conveyor chain cover removably connected to the interior surface of the side member to enable access to components of the conveyor from the interior of the frame, the conveyor chain cover including
  - a chain cover member engaged with the side member, the chain cover member including a cover portion extending from the side member and over the chain to cover the chain, and
  - an access panel connected to the chain cover member; and
- a breaker positioned adjacent the conveyor and operable to process material;
- wherein the frame side member and the chain cover member include locating features to position the chain cover member on the frame side member; and wherein one of the frame side member and the chain cover member includes a projection and the other of the frame side member and the chain cover member includes an aperture sized to receive the projection to locate the chain cover member on the side member.

7. The feeder-breaker of claim 1, wherein the cover portion extends substantially parallel to the deck.

8. The feeder-breaker of claim 1, wherein the chain cover member includes a mounting portion angled with respect to the cover portion, the mounting portion being coupled to the interior surface of the side member.

9. The feeder-breaker of claim 8, wherein the mounting portion includes a flange extending along the axis, the access panel being connected to the flange.

10. The feeder-breaker of claim 8, wherein the access panel is coupled to the mounting portion at an oblique angle relative to the cover portion.

11. The feeder-breaker of claim 8, wherein the access panel is coupled to the mounting portion at an oblique angle relative to the deck.

12. A cover assembly for a conveyor of a feeder-breaker, the feeder-breaker being operable to process material, the feeder-breaker including a frame including a side member extending along an axis, the side member having an interior surface facing toward an interior of the frame and an exterior, a conveyor supported by the frame and operable to convey material along the axis, the conveyor having an intake end and a discharge end, the conveyor including a deck for supporting material, a chain movably supported on the deck and extending generally along the axis, the chain being positioned proximate the interior surface of the side member, a plurality of flights coupled to the chain for movement with the chain, and a drive engaging the chain and operable to move the chain such that the flights travel across the deck to move the material from the intake end to the discharge end, and a breaker positioned adjacent the conveyor and operable to process material, the cover assembly comprising:

a chain cover member engageable with the side member, the chain cover member including a cover portion extending from the side member and over the chain to cover the chain; and an access panel connected to and extending over the chain cover member, the access panel being removable from the chain cover member to allow access to the chain cover member;

the chain cover member and the access panel being removably connectable to the interior surface of the side member to enable access to components of the conveyor from the interior of the frame.

13. The cover assembly of claim 12, wherein the frame further includes a second side member extending along the axis, the conveyor between first-mentioned side member and second side member, wherein the conveyor further includes a second chain movably supported on the deck and extending generally along the axis, the second chain being positioned proximate the second side member, the plurality of flights being coupled between the first-mentioned chain and the second chain for movement with the first-mentioned chain and the second chain, and wherein the cover assembly further comprises:

a second chain cover member engageable with the second side member, the second chain cover member including a second cover portion extending from the second side member and over the second chain to cover the second chain; and a second access panel connected to the second chain cover member;

the second chain cover member and the second access panel being removably connectable to the interior surface of the second side member to enable access to components of the conveyor from the interior of the frame.

14. The cover assembly of claim 12, wherein one of the frame side member and the chain cover member includes a projection and the other of the frame side member and the chain cover member includes an aperture sized to receive the projection to locate the chain cover member on the side member.

15. The cover assembly of claim 12, wherein the cover portion is positionable to extend substantially parallel to the deck.

16. The cover assembly of claim 12, wherein the chain cover member includes a mounting portion angled with respect to the cover portion, the mounting portion being couplable to the interior surface of the side member.

17. The cover assembly of claim 16, wherein the mounting portion includes a flange extending along the axis, the access panel being connected to the flange.

18. The cover assembly of claim 16, wherein the access panel is coupled to the mounting portion at an oblique angle relative to the cover portion.

19. The cover assembly of claim 16, wherein the access panel is coupled to the mounting portion at an oblique angle relative to the deck.

20. A method of assembling a cover assembly for a conveyor of a feeder-breaker, the feeder-breaker being operable to process material, the feeder-breaker including a frame including a side member extending along an axis, the side member having an interior surface facing toward an interior of the frame and an exterior portion covered by material during operation of the feeder-breaker, a conveyor supported by the frame and operable to convey material along the axis, the conveyor having an intake end and a discharge end, the conveyor including a deck for supporting material, a chain movably supported on the deck and extending generally along the axis, the chain being positioned proximate the interior surface of the side member, a plurality of flights coupled to the chain for movement with the chain, and a drive engaging the chain and operable to move the chain such that the flights travel across the deck to move the material from the intake end to the discharge end, and a breaker positioned adjacent the conveyor and operable to process material, the method comprising:

mounting a chain cover member to the interior surface of the side member;

positioning a cover portion of the chain cover member to extend from the side member and over the chain to cover the chain;

engaging an access panel to the chain cover member; and removably connecting the cover assembly to the interior surface of the side member to enable access to components of the conveyor from the interior of the frame.

* * * * *